Oct. 5, 1926.

C. E. HAMMOND

ACCELERATOR

Filed Feb. 16, 1926

1,602,107

Inventor:
Clinton E. Hammond
by Spear Middleton Donaldson & Hall
Attys.

Patented Oct. 5, 1926.

1,602,107

UNITED STATES PATENT OFFICE.

CLINTON E. HAMMOND, OF BOYNE CITY, MICHIGAN, ASSIGNOR, BY DIRECT AND MESNE ASSIGNMENTS, OF ONE-SIXTH TO E. N. CLINK, ONE-SIXTH TO F. R. WILLIAMS, AND ONE-THIRD TO ELISHA N. CLINK, ALL OF EAST JORDAN, MICHIGAN, AND ONE-THIRD TO LEILA M. CLINK.

ACCELERATOR.

Application filed February 16, 1926. Serial No. 88,590.

The present invention aims to provide a simple and economical attachment which may be readily applied to a Ford motor car by means of which the throttle may, under running conditions, be operated by a hand throttle lever or foot accelerator selectively and by which also the throttle will be opened automatically by the operation of the low gear or reverse levers so as to speed up the engine sufficiently to prevent stalling and at the same time not sufficiently to permit racing of the engine which is so common and objectionable in the use of Fords equipped with hand throttles only.

With the foregoing and other objects in view the invention includes the novel features of construction and arrangement and combination of parts hereinafter described and particularly defined by the appended claims.

In order that the invention may be more readily understood, reference is made to the accompanying drawings in which—

Figure 1:
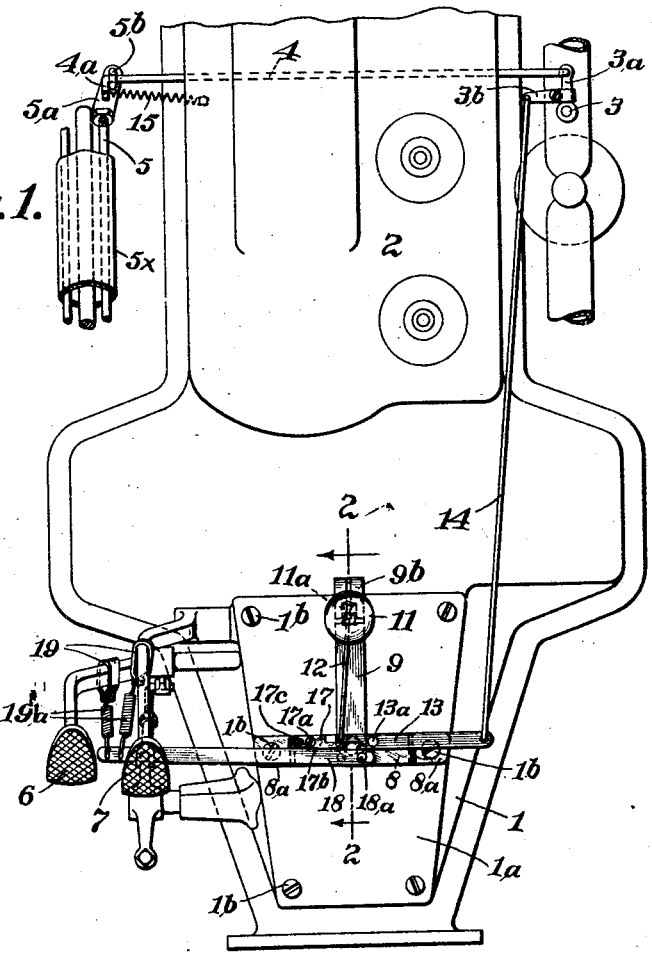
Figure 1 is a plan view of a "Ford" transmission casing and rear half of the engine block, and showing also the lower end of the steering post, throttle, and connections and the clutch and reverse levers and accelerator connections.

Referring by reference characters to this drawing the numeral 1 designates the transmission housing, 2 the engine block, and 3 the throttle valve which is provided with a two armed or bell crank lever, one arm $3^a$ of which is connected by the usual cross rod 4 to an arm $5^a$ at the lower end of the oscillating hand throttle rod 5, which is carried in the usual manner within the hollow steering post or rod $5^x$ as will be well understood by those familiar with Ford automobiles. $1^a$ designates the cover of the transmission housing which is secured in place by screw bolts $1^b$, and 6 and 7 designate respectively the clutch pedal and the reverse pedal, the clutch pedal, as is well known being held in said position for neutral, pushed forward for "low" and allowed to come clear back for "high". The brake pedal is omitted for clearness of illustration.

My improved attachment comprises a cross bar or bracket 8 having depressed ends $8^a$ provided with bolt holes spaced to receive the two intermediate ones of cover bolts $1^b$ whereby said cross bar may be held to the housing by said cover securing bolts. To the under side of the central portion of the cross bar 8 is connected the rear end of a bracket 9 which extends forward towards the upper end of the housing, being preferably inclined downwardly as at $9^a$ to rest on the housing, and thence doubled back on itself to form the inclined or cam face $9^b$, whereafter it is provided with a portion $9^c$ adapted to extend upward through an opening $10^a$ in the floor board 10.

Figure 2:
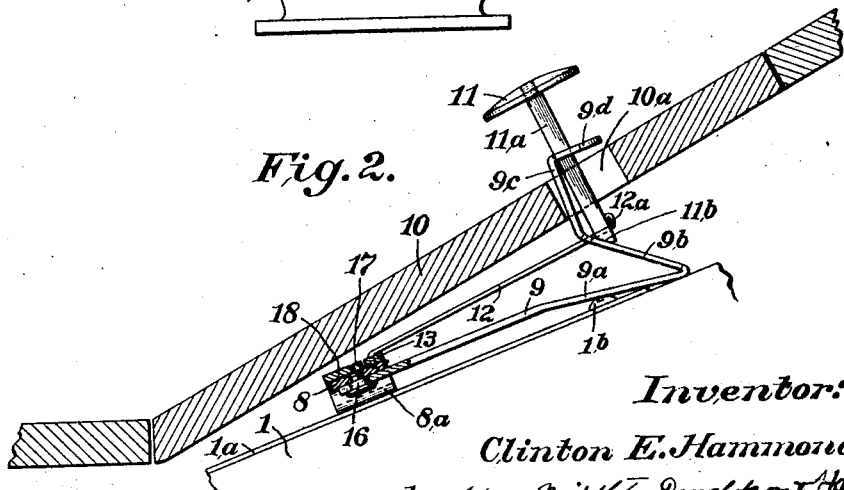
Fig. 2 is a sectional view on line 2—2 of Fig. 1, but showing also in section the floor boards.

The upper end of the portion $9^c$ is bent over at approximately right angles $9^d$ and provided with an opening or eye through which passes the shank or rod $11^a$ of the foot accelerator 11. The lower end of the rod $11^a$ is preferably beveled to provide a face $11^b$ inclined to correspond to and bear against the cam face of portion $9^b$. The said portion $9^b$ has a narrow vertically elongated slot through which passes a rod 12 connected at its front end (at $12^a$) to the lower end of accelerator rod $11^a$ and at its rear end to the one end of a lever 13, conveniently by bending over the end of the rod 12 (which may be merely a wire of sufficient gauge) and passing it through a hole in or adjacent the end of the lever 13. The lever 13 is fulcrumed on a fixed pivot on the bracket (such as rivet $13^a$) and its opposite end is connected by a wire or rod 14 with the other and transversely extending arm $3^b$ of the throttle. Normally the throttle is held in closed position by the spring 15 at which time the accelerator 11 would be held elevated in the position shown in Fig. 2, but pressure of the foot of the operator on its head 11 will force it downward and the cam face $9^b$ will cause the lower end of the member $9^a$ to be swung or pressed forward, thus swinging the lever 13 about its pivot and opening the throttle. By this construction I not only secure parts that can be cheaply made and assembled, but a foot accelerator which is capable of being easily actuated to the precise degree necessary for any and all speeds and is not liable to have its position accidentally altered by jolting of the car.

Preferably the rear end of the portion 9ª is provided with an open slot or fork in its end which engages a rivet 16 carried by the bar or bracket 8.

Overlying the rear face of the inner end of lever 13 is a supplemental lever 17 fulcrumed at 17ª on the bar 8, the overlapping ends being preferably rebated as shown in Fig. 1 to reduce width and save space.

The supplemental lever has a bearing portion or shoulder 17ᵇ which abuts against the edge or side of an auxiliary lever 18 articulated on fixed pivot 18ª and extending into a position in rear of and suitably spaced from the clutch and reverse pedal levers, to which it is respectively connected by flexible connections. These preferably take the form of loop members 19 pinned or otherwise secured to the respective levers and connected by springs 19ª to the end of lever 18. The ends of each spring is preferably connected to the lever by a lost motion connection as by having an angularly bent or hooked end engaging an elongated slot in the lever as shown in Fig. 1.

The connections are so adjusted that if either the clutch pedal or the reverse pedal is pushed forward to low gear or reverse drive position lever 18 will, through supplemental lever 17, impart a small amount of movement to lever 13 which will open the throttle just enough to give the engine the requisite speed to prevent stalling. Immediately upon release of either the clutch or reverse levers the throttle will close automatically and thus any racing of the engine is prevented.

In order that the accelerator connections may operate the throttle without disturbing the hand throttle the lever arm 5ª is provided with an eye 5ᵇ through which the rod 4 is passed and is provided with an angularly turned end 4ª which serves as a shoulder against which eye 5ᵇ acts when moved to the left Fig. 1 while rod 4 can slide through the eye when the accelerator connections are operated.

Said end 4ᵇ also serves as a convenient means of attachment of the spring 15.

Preferably also I provide means for varying the amount of movement of lever 13 under the action of the foot and throttle levers. This may be accomplished by shifting the fulcrum of auxiliary lever 17 for example by means such as the provision of one or more additional holes for the pivot pin 17ª, one additional hole being indicated at 17ᶜ.

While I have spoken of my accelerator attachment as particularly adapted for Ford cars, it will be understood that I do not limit myself to this particular motor vehicle.

I claim:

1. An accelerator for motor vehicles comprising a throttle actuating lever, a stationary cam member, an accelerator pedal having a shank slidably engaging said cam, guiding means for said shank and an operating connection between the down end of said shank and said throttle actuating lever.

2. An accelerator for motor vehicles comprising a throttle actuating lever, a member having an inclined cam portion and an upstanding portion provided with a guide, an accelerator pedal having a shank slidably engaging said guide and with its lower end engaging said inclined cam portion, and a connection between said lower end and said throttle lever.

3. An accelerator for motor vehicles comprising a throttle actuating lever, a member having an inclined cam portion and an upstanding portion provided with a guide, an accelerator pedal having a shank slidably engaging said glide and with its lower end engaging said inclined cam portion, said cam portion having an elongated slot, and a tie rod passing through said slot and connecting the lower end of said shank with said throttle actuating lever.

4. In a device of the class described, a bracket member adapted for attachment to a transmission housing, a throttle actuating lever fulcrumed thereon, a foot throttle operatively connected with said throttle actuating lever, an auxiliary lever fulcrumed on said bracket and extending into proximity to the clutch and reverse pedals, means whereby movement of said auxiliary lever operates said throttle actuating lever, and flexible connections between said clutch and reverse pedals and said auxiliary lever.

5. In a device of the class described, a bracket member adapted for attachment to a transmission housing, a throttle actuating lever fulcrumed thereon, a foot throttle operatively connected with said throttle actuating lever, an auxiliary lever fulcrumed on said bracket and extending into proximity to the clutch and reverse pedals, means whereby movement of said auxiliary lever operates said throttle actuating lever, and extensible springs connecting said clutch and reverse pedals with said auxiliary lever.

6. In a device of the class described, a bracket member adapted for attachment to a transmission housing, a throttle actuating lever fulcrumed thereon, a foot throttle operatively connected with said throttle actuating lever, an auxiliary lever fulcrumed on said bracket and extending into proximity to the clutch and reverse pedals, means whereby movement of said auxiliary lever operates said throttle actuating lever, and extensible springs connecting said clutch and reverse pedals with said auxiliary lever, each of said springs having a lost motion connection to said auxiliary lever.

7. An accelerator attachment for motor cars comprising a bracket having apertured ends adapted to be secured by the transmission cover bolts, a throttle actuating lever articulated thereto, a foot throttle having connections for operating said actuating lever, an auxiliary lever fulcrumed on said bracket and extending into proximity to the clutch and reverse pedals, operating connections between said pedals and said auxiliary lever, and means whereby said auxiliary lever operates said throttle actuating lever.

8. An accelerator attachment for motor cars comprising a bracket having apertured ends adapted to be secured by the transmission cover bolts, a throttle actuating lever articulated thereto, a foot throttle having connections for operating said actuating lever, an auxiliary lever fulcrumed on said bracket and extending into proximity to the clutch and reverse pedals, operating connections between said pedals and said auxiliary lever, and adjustable operating means interposed between said supplemental lever and actuating lever for varying the movement of the latter relative to the former.

9. An accelerator attachment for motor cars comprising a bracket bar having apertured ends for securing it by the transmission cover bolts, a throttle actuating lever articulated thereto and having one end connected to the throttle, a foot accelerator connected to the other end, a supplemental lever fulcrumed on said bracket bar and having an end overlapping said other end of the actuating lever, said supplemental lever having a shoulder, an auxiliary lever fulcrumed on said bracket bar and abutting said shoulder, and extending into proximity to the clutch and reverse pedals, and operating connections between said pedals and said supplemental lever.

In testimony whereof I affix my signature.

CLINTON E. HAMMOND.